United States Patent

Kawasaki et al.

[11] 4,291,940
[45] Sep. 29, 1981

[54] LOW LOSS ACCESS COUPLER FOR MULTIMODE OPTICAL FIBER DISTRIBUTION SYSTEMS

[75] Inventors: Brian S. Kawasaki, Carleton Place; Kenneth O. Hill, Kanata; Derwyn C. Johnson, Ottawa, all of Canada

[73] Assignee: Canadian Patents & Development Ltd., Ottawa, Canada

[21] Appl. No.: 805,865

[22] Filed: Jun. 13, 1977

[51] Int. Cl.³ .............................................. G02B 5/172
[52] U.S. Cl. ................................. 350/96.15; 65/4.2
[58] Field of Search ............. 65/4 R, 4 A, 4 B, 4.1, 65/4.2, 4.21, 4.3, 4.4; 350/96.15, 96.16, 96.30, 320

[56] References Cited

U.S. PATENT DOCUMENTS

| | | | |
|---|---|---|---|
| 3,227,535 | 1/1966 | Woodcock | 65/4 B |
| 4,008,061 | 2/1977 | Ramsay | 65/4 A |
| 4,054,366 | 10/1977 | Barnoski et al. | 350/96.15 |
| 4,083,625 | 4/1978 | Hudson | 350/96.15 |

FOREIGN PATENT DOCUMENTS 2274053  1/1976  France ............................... 350/96.15

OTHER PUBLICATIONS

Ozeki et al., "Tapered Section of Multimode Cladded Fibers . . . ", *Appl. Phys. Ltrs.*, vol. 26, No. 7, Apr. 1, 1975, pp. 386-388.
Ozeki et al., "Optical Directional Coupler Using Tapered Sections . . . ", *Appl. Phys. Ltrs.*, vol. 28, No. 9, 1 May 1976, pp. 528-529.
Yamamoto et al., "A Large-Tolerant Single-Mode Optical Fiber Coupler . . . ", *Proc. of IEEE*, Jun. 1976, pp. 1013-1014.
Barnoski et al., "Fabrication of an Access Coupler . . . ", *Applied Optics*, vol. 15, No. 11, Nov. 1976, pp. 2629-2630.

Primary Examiner—John D. Lee
Attorney, Agent, or Firm—Edward Rymek

[57] ABSTRACT

The low loss access coupler includes two multimode optic fibers, each having a biconical taper section. The biconical taper sections of the fibers are fused together to provide optical coupling between the fibers. The fused fibers may also be twisted around one another to enhance mode mixing. The access couplers may be produced by fusing two fibers together along a small length, then heating the fused length and pulling the fibers to form the biconical tapers; or by twisting a portion of each of the fibers around one another, applying a tensile force to the twisted portions of the fibers and heating a region of the twisted fibers to soften and fuse a predetermined length of twisted fibers. If the fibers already have biconical taper sections, the access coupler may be produced by twisting the fibers together along their taper sections and heating a region of the taper sections to fuse them together.

9 Claims, 1 Drawing Figure

LOW LOSS ACCESS COUPLER FOR MULTIMODE OPTICAL FIBER DISTRIBUTION SYSTEMS

BACKGROUND OF THE INVENTION

This invention is directed to fiber optic couplers and in particular to low loss access couplers for multimode optical fibers and a method of producing these couplers.

The two main network topology systems for the distribution of optical communication signals using single-strand multimode fibers are the tree distribution system and the star system. For networks with many terminals the tree distribution scheme provides advantages of flexibility in the number and location of the distribution paths or drops and minimizes the amount of fiber used in comparison to a star system. However, a tree network can suffer from an ineffective utilization of the total optical power launched in the trunk feeder if there are many lossy access junctions along the trunk which are encountered in series. The tree scheme can be effectively utilized only if the excess loss above furcation loss at each access junction is made sufficiently small.

Recently two methods for producing low loss access couplers for multimode fibers have been demonstrated. In the first which is described in a publication by Takeshi Ozeki and Brian S. Kawasaki entitled "Optical directional coupler using tapered sections in multimode fibers", Applied Physics Letters, Vol. 28, No. 9, May 1, 1976—pages 528 and 529, twin biconical tapered sections of multimode optical fibers are joined by an optical epoxy to produce a directional coupler. In the second which is described in a publication by M. K. Barnoski and H. R. Friedrich entitled "Fabrication of an access coupler with single strand multimode fiber waveguides",-Applied Optics, Vol. 15, No. 11, November 1976, pages 2629-2630, two sections of multimode fiber are fused side-by-side to form a low loss junction. In both of these structures, the excess loss is in the order of 1 dB.

SUMMARY OF THE INVENTION

It is therefore an object of this invention to provide an access coupler having highly efficient coupling action.

It is a further object of this invention to provide an access coupler in which considerable mode mixing and mode coupling occurs.

It is another object of this invention to provide an access coupler which is directional.

It is a further object of this invention to provide an access coupler which has isolation of the uncoupled port.

It is another object of this invention to provide simple and inexpensive methods of producing low loss access couplers.

These and other objects are achieved in an access coupler comprising a first and a second multimode fiber, each of the fibers having a biconical taper section, the biconical taper sections of the fibers being twisted around one another and fused together along a predetermined length.

One method of producing an access coupler for coupling optic energy between a first and a second multimode fiber, comprises fusing the first and the second fiber together along a predetermined length, applying a tensile force to the length of fused fibers, and heating the fused length of fibers to form biconical taper sections in the fused fibers.

Another method of producing an access coupler for coupling optic energy between a first and a second multimode fiber comprises twisting a portion of each of the fibers around one another, applying a tensile force to the twisted portions of the fibers and heating a region of the twisted fibers to soften the fibers forming biconical taper sections and to fuse a predetermined length of the twisted fibers together.

If the fibers already have biconical taper sections, the access coupler may be produced by twisting the fibers together along their taper sections and heating a region of the taper sections to fuse them together.

DESCRIPTION OF THE PREFERRED EMBODIMENTS

Figure 1:
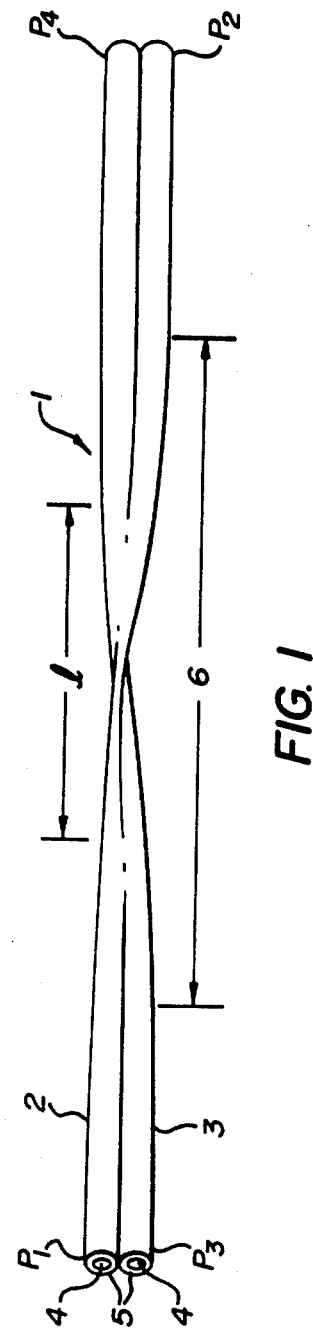
FIG. 1 illustrates an access coupler in accordance with this invention.

FIG. 1 illustrates an access coupler 1 in accordance with the present invention. The access coupler 1 consists of a first fiber 2 with ends or ports $P_1$ and $P_2$ and a second fiber 3 with ends or ports $P_3$ and $P_4$. Each fiber 2,3 may be a graded index multimode fiber or a stepped index multimode fiber having an optical core 4 and a cladding 5. Each fiber 2,3 also has a biconical tapered section 6 in which the diameter of the fiber 2,3 narrows and then widens to the normal fiber diameter. Within the tapered section 6, the fibers 2,3 are fused together along a predetermined length l which may be greater than the entire length of section 6. In addition, within this fuel length l, the fibers 2 and 3 may be twisted around one another as shown in FIG. 1.

Generally, fibers 2 and 3 have similar diameters, however, fibers of different diameters may be used in an access coupler 1 in which is it desired to have preferential coupling. If fiber 3 has a greater diameter than fiber 2 optical energy will be preferentially coupled to fiber 3 from fiber 2, that is to the larger diameter fiber. Optical energy can thus be efficiently coupled into a trunk line using a coupler 1 in which the larger diameter fiber is connected into the line and optical energy is coupled into the line via the smaller diameter fiber.

The access coupler 1 may be produced by fusing a predetermined length of the fibers 2 and 3 together. Once fused, the fibers are pulled by a tensile force and the fused length is heated to soften the fibers 2 and 3 such that they may be drawn to form biconical taper sections 6.

Another method by which couplers 1 may be produced consists of taking two fibers 2 and 3, twisting or winding the fibers 2 and 3 around one another and applying a tensile force to the fibers 2 and 3, as by putting them under spring tension in a clamping jig. A desired region of the twisted fibers 2 and 3 is then heated sufficiently to soften and fuse the fibers 2 and 3. The spring tension causes the fibers 2 and 3 to be elongated in the softened region forming the biconical tapers, and the twist in the fibers 2 and 3 causes the fibers 2 and 3 to stay together and to fuse during the pulling process. The heating of the fibers 2 and 3 in the desired region may be accomplished by an oxy-butane microtorch flame.

However, if the two fibers already have biconical taper sections 6, the access coupler 1 may be produced by twisting the two fibers 2 and 3 together along their taper sections and heating a region of the twisted biconical taper sections to fuse the fibers 2 and 3 together along a predetermined length l of the taper sections. These methods of producing access couplers may be used to produce the couplers in a plant or may be used in the field to produce couplers directly on a multimode fiber bus.

Some examples of twisted access couplers 1 fabricated using the second process described, are tabulated in Table 1 below. The couplers 1 were made from Corning silica step-index fibers having an 85 micron core diameter, a 20 micron cladding thickness and a numerical aperture of 0.175. The biconical section 6 was approximately 1 cm. long. The access couplers 1 were evaluated by illuminating port $P_1$ with a HeNe beam coupled into port $P_1$ of fiber 2 with a ×50 microscope objective. Oil bath cladding mode strippers were mounted on ports $P_1$, $P_2$ and $P_4$ and the power coupled from ports $P_2$ and $P_4$ was measured. The input power to the coupler 1 through port $P_1$ was measured by breaking the fiber 2 at a point located downstream from the mode stripper and upstream from section 6.

TABLE 1

| Coupler | $P_1$ (mW) | $P_2$ (mW) | $P_4$ (mW) | Coupling Ratio $P_4/P_1$ | Excess Insertion Loss $10 \log \left[ \frac{P_2 + P_4}{P_1} \right]$ (dB) |
|---|---|---|---|---|---|
| a | 7.05 | 6.53 | 0.27 | 0.038 | −0.16 |
| b | 6.92 | 6.00 | 0.58 | 0.084 | −0.22 |
| c | 6.30 | 5.41 | 0.74 | 0.12 | −0.11 |
| d | 7.20 | 6.12 | 0.87 | 0.12 | −0.13 |
| e | 6.92 | 4.40 | 1.65 | 0.24 | −0.58 |

Table 1 shows the measured power levels and the calculated excess insertion loss for several couplers with various values of the coupling ratio $P_4/P_1$ where $P_1$ represents the optical power in coupler port $P_1$. This coupling ratio increases with an increase of the ratio of the diameter of the fiber to the diameter of the narrowest portion of each taper. The coupling ratio can vary from near zero with no taper section, to 50% with very high values of diameter ratio, i.e. >10:1. Generally, increasing values for coupling ratios lead to increased insertion losses. The values of excess insertion loss are very low with the better couplers having values between 0.1 and 0.2 dB. This efficient coupling action is the result of the operation of the access coupler in accordance with the present invention. As the light in port $P_1$ enters the narrowing tapered section 6, the higher order modes are forced to radiate out of the core 4 area to be guided as cladding modes. The light can cross the fused boundary between the two biconical sections and is therefore guided in the overall structure. As the light propagates beyond to the region of increasing tapers associated with ports $P_2$ and $P_4$, the cladding modes propagate at gradually decreasing angles to the fiber axis and are recaptured by the tapered core section to again become core modes in the untapered portions of the fibers. The coupling action is much less lossy in this type of structure than in the structure described by Ozeki and Kawasaki because of the high optical quality of the air-cladding interface. In the present access coupler, it is difficult to discern the coupling region from a cursory examination of the scattered light alone. The coupling action is also more efficient than in the coupler described by Barnoski and Friedrich because of the increasing taper section 6. In this region of the device, light which is propagating in the cladding region can be recaptured by the core because the effect of an increasing taper is to reduce the propagation angle of the light. It is important that the light propagating in the tapered sections 6 be totally reflected at the interface between the surface of the tapers 6 and the surrounding medium. Therefore, the biconical taper sections 6 should be long and shallow and without sharp angles.

Another significant characteristic of the present device is that considerable mode mixing occurs. Though the low order modes are predominantly in port $P_2$ rather than port $P_4$ as expected, a fairly uniform filling of the modes is observed in port $P_4$. The mode mixing is enhanced due to the twist asymmetry in the access coupler 1. This result, though unexpected is particularly advantageous when these couplers are used in series as a part of a tree distribution network.

It is also noted that a high degree of directionality or isolation is observed in the access coupler 1 in accordance with this invention. For example, when port $P_1$ is illuminated, the light propagates in one direction appearing at ports $P_2$ and $P_4$ with an excess insertion loss of 0.1 to 0.2 dB loss and with virtually no light appearing at port $P_3$. Isolations in the order of −60 dB (10 ln $P_3/P_1$) have been measured for access coupler 1.

We claim:

1. An access coupler comprising:
   a first multimode optic fiber having a biconical taper section and a second multimode optic fiber having a biconical taper section, the taper sections fused together and twisted around one another along a predetermined length of said taper sections to provide optical coupling between the fibers.

2. An access coupler as claimed in claim 1 wherein said first and second optic fibers are step index fibers each consisting of a core of optic transmissive material and a cladding of optic material covering the core material.

3. An access coupler as claimed in claim 1 wherein said first and second optic fibers are graded index fibers.

4. An access coupler as claimed in claim 1 wherein the diameter of said first fiber is similar to the diameter of said second fiber.

5. An access coupler as claimed in claim 1 wherein the diameter of said first fiber is smaller than the diameter of said second fiber to provide preferential optical coupling from said first fiber to said second fiber.

6. A method of producing an access coupler for coupling optical energy from a first multimode optic fiber to a second multimode optic fiber comprising:
   twisting a portion of each of the first and second optic fibers around one another;
   applying a tensile force to the twisted portion of the first and second fibers;
   heating a region of the twisted fibers to soften the fibers in the region thereby elongating the region of twisted fibers into biconical taper sections and to fuse together a predetermined length of the biconical taper sections.

7. A method as claimed in claim 6 wherein the heating is provided by an oxy-butane microtorch flame.

8. A method as claimed in claim 7 wherein the tensile force is applied by clamping the fibers in a spring tensioned jig.

9. A method of producing an access coupler for coupling optic energy from a first multimode optic fiber having a biconical taper section to a second multimode optic fiber having a biconical taper section comprising:
  twisting the first and second optic fibers around one another at their biconical taper section; and
  heating a region of the twisted biconical taper sections to fuse the fibers together along a predetermined length of the taper section.

* * * * *